No. 858,441. PATENTED JULY 2, 1907.
G. W. CLARK.
FILTER.
APPLICATION FILED MAR. 5, 1907.
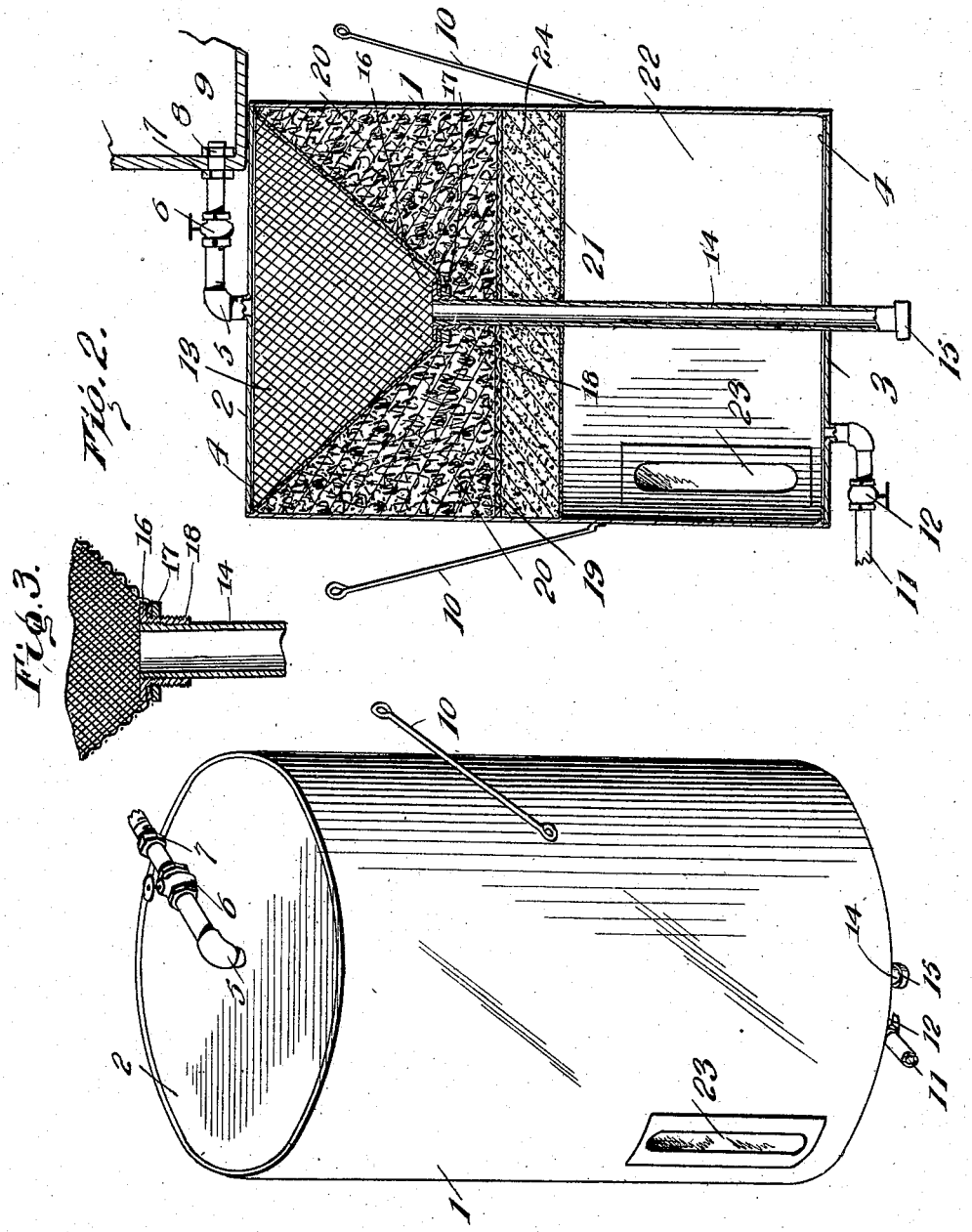
Witnesses
Inventor
G. W. Clark
By
Attorneys

UNITED STATES PATENT OFFICE.

GEORGE W. CLARK, OF CARROLL, NEBRASKA, ASSIGNOR OF ONE-HALF TO JULES M. MOUCHET, OF NORTHVILLE, SOUTH DAKOTA.

FILTER.

No. 858,441.      Specification of Letters Patent.      Patented July 2, 1907.

Application filed March 5, 1907. Serial No. 360,635.

*To all whom it may concern:*

Be it known that I, GEORGE W. CLARK, a citizen of the United States, residing at Carroll, in the county of Wayne and State of Nebraska, have invented certain new and useful Improvements in Filters, of which the following is a specification.

This invention has for its object to purify water, being especially designed for use in connection with traction or portable engines which derive their supply of water from a cistern or tank. However, it is to be understood that the device may be used in any connection or relation for separating foreign material, such as mud, gravel and floating particles, from the water.

For a full description of the invention and the merits thereof and also to acquire a knowledge of the details of construction of the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a perspective view of a filter embodying the invention. Fig. 2 is a vertical central section thereof, showing the parts on a larger scale. Fig. 3 is a detail view of the lower portion of the separating chamber showing the means for connecting the sediment or trap pipe thereto.

Corresponding and like parts are referred to in the following description and indicated in the views of the drawings by the same reference characters.

The body 1 of the filter may be of any cross sectional outline and size according to the capacity and special use of the device and is closed at its ends by means of caps 2 and 3 which may be bolted or otherwise attached thereto. In the event of the caps 2 and 3 being separate from and attached to the body 1, packing 4 of any material may be interposed between them and the body so as to secure a tight joint. A supply pipe 5 connects centrally with the upper end of the body and communicates with the source from which the supply of water is drawn. A cock 6 is located in the length of the supply pipe 5 to admit of regulating the supply of water as may be desired. Nuts 7 and 8 are fitted to the outer end of the supply pipe 5 and between said nuts is clamped the wall of the tank 9 or other receptacle containing the water intended to supply the engine. Braces 10 are interposed between the body of the filter and the tank 9 or other structure to which the filter may be secured. A delivery pipe 11 connects with the cap 3 or bottom of the body 1 and is adapted to make connection with the engine, not shown, so as to supply water thereto freed from all foreign matter not held in solution. A cock 12 is located in the length of the delivery pipe 11 for regulating the flow of water therethrough.

A separating chamber 13 is located in the upper portion of the body 1 and is upwardly flared or of funnel shape and a pipe 14 is pendent therefrom and extends a short distance below the lower cap 3 or bottom of the body and is closed by means of a cap 15. The pipe 14 is centrally disposed and constitutes a trap in which sediment collects to be drawn off at intervals by removing the cap 15. The walls of the chamber 13 may be formed of foraminous or reticulated material or of wire gauze, the same being strengthened and secured to the body 1 in any effective manner. The lower or contracted end of the inclosing walls of the separating chamber 13 is confined between parts 16 and 17, the former being an outer flange at the upper end of a short tube 18 and the latter being a nut threaded upon the outer end of the said part 18. Obviously, the parts 16 and 17 may be bolted or secured in any manner so as to clamp between them the lower end portion of the walls forming the chamber 13. The pipe 14 connects in any manner with the tube 18, being preferably threaded thereto. A partition 19 is arranged within the body 1 a short distance below the separating chamber 13 and may consist of a plate and series of openings or may be formed of wire fabric. The purpose of the partition 19 is to form a support for filtering material 20, which in the present instance preferably consists of small pieces of charcoal closely packed in the space formed between the chamber 13 and the partition 19. A second partition 21 is located a short distance below the partition 19 and its openings or mesh are of such a size as to prevent the escape of fine filtering material 24, such as sand, which occupies the space formed between the two partitions. Each of the partitions is formed with a central opening through which the pipe 14 passes and said partitions are supported within the body 1 in any manner to admit of their ready removal when it is required to gain access to the interior of the filter for cleaning or for any desired purpose.

The space 22 below the partition 21 and between it and the lower cap or bottom 3 receives the filtered water from which a quantity may be drawn at a time through the delivery pipe 11 upon opening the cock 12. A side gage 23 is located opposite to the water space 22 and comprises a frame having a vertical elongated opening which is adapted to register with a corresponding opening formed in the side of the body 1. This frame may be bolted or attached to the body 1 in any manner, and between it and said body is secured a plate of glass or other translucent material which will admit of the interior of the filter being under observation at all times so as to determine the level of the water therein.

The filter constructed substantially as herein specified, is adapted to be connected to the engine or other device to be supplied with filtered water and to the tank or reservoir containing the water to be filtered in any manner, and is strengthened by the braces 10 which may be attached to the supporting structure in any way. Upon opening the cock 6, the water from the tank or reservoir flows through the pipe 5 into the separating chamber 13 and any coarse matter contained therein is removed by coming in contact with the walls of said chamber 13. The water, in its passage through the filtering media 20 and 24, has the finer matter removed therefrom. The water will accumulate in the chamber 13 because of its comparatively slow passage through the filter media, hence precipitation of mud, sand or the like will take place and said precipitate or settlement will gravitate and finally enter the pipe 13 in which it will accumulate and from which it may be drawn at intervals. The filtering medium or material 24 is preferably sand which is found best adapted for removing light material held in suspension in the water and not separable therefrom in the chamber 13 or by the filtering medium 20.

Having thus described the invention, what is claimed as new is:

1. In a filter, the combination of a hollow body, a separating chamber at the upper or receiving end thereof, filtering media arranged below said separating chamber in strata, and a pipe leading from the bottom of said separating chamber through the strata of filtering media and projecting beyond said hollow body and provided with a removable closure to admit of removing accumulations therefrom at stated intervals.

2. In a filter, the combination of a hollow body, a flared separating chamber at the upper or receiving end thereof, filtering media surrounding and arranged below the said separating chamber in the form of strata, a pipe pendent from said separating chamber and passing through the filtering strata and extending below the bottom of the body and provided at its lower end with a removable closure, and valved supply and delivery pipes connected with opposite ends of said body.

3. The herein described filter comprising a hollow body having valved supply and delivery pipes connected with opposite ends, a flared separating chamber located at the upper or receiving end of said body, spaced partitions arranged below the separating chamber, filtering material supported by said partitions and separated thereby into strata, a pipe pendent from the separating chamber and extending through said partitions and filtering strata and projecting below the body and provided at its lower end with a removable closure, and a side gage fitted to a side of the body opposite the space formed between the bottom of the body and the lowermost partition.

In testimony whereof I affix my signature in presence of two witnesses.

GEORGE W. CLARK. [L. S.]

Witnesses:
G. B. SPEARS,
E. G. STEPHENS.